(12) United States Patent
Guillou et al.

(10) Patent No.: US 12,351,290 B2
(45) Date of Patent: Jul. 8, 2025

(54) ELECTRICALLY PROPELLED AIRSHIP HAVING A RIGID FRAME AND POWER-GENERATING NACELLE WITH WHICH THE AIRSHIP IS PROVIDED

(71) Applicant: Flying Whales, Suresnes (FR)

(72) Inventors: Pierrot Guillou, Suresnes (FR); Clémence Taillardat, Suresnes (FR)

(73) Assignee: Flying Whales, Suresnes (FR)

( * ) Notice: Subject to any disclaimer, the term of this patent is extended or adjusted under 35 U.S.C. 154(b) by 0 days.

(21) Appl. No.: 18/290,629

(22) PCT Filed: Jul. 21, 2022

(86) PCT No.: PCT/FR2022/051454
§ 371 (c)(1),
(2) Date: Jan. 19, 2024

(87) PCT Pub. No.: WO2023/002133
PCT Pub. Date: Jan. 26, 2023

(65) Prior Publication Data
US 2024/0326976 A1    Oct. 3, 2024

(30) Foreign Application Priority Data
Jul. 21, 2021 (FR) ...................................... 2107881

(51) Int. Cl.
*B64B 1/28* (2006.01)
*B64D 27/24* (2006.01)

(52) U.S. Cl.
CPC ................ *B64B 1/28* (2013.01); *B64D 27/24* (2013.01)

(58) Field of Classification Search
CPC .................................. B64D 27/24; B64B 1/28
See application file for complete search history.

(56) References Cited

U.S. PATENT DOCUMENTS 3,834,655 A * 9/1974 Crosby, Jr. ............. B64D 39/00
244/33
5,368,256 A 11/1994 Kalisz et al.
(Continued)

FOREIGN PATENT DOCUMENTS

DE          19753548 A1 * 8/1999 ............... B64B 1/22
DE      202018003924         10/2018
(Continued)

OTHER PUBLICATIONS

International Search Report for Application No. PCT/FR2022/051454 dated Oct. 20, 2022, 2 pages.
(Continued)

*Primary Examiner* — Philip J Bonzell
(74) *Attorney, Agent, or Firm* — TraskBritt

(57) ABSTRACT

An airship comprises a main body having a rigid structure surrounding a plurality of containers for a lighter-than-air gas, a plurality of propeller units mechanically connected to the rigid structure and each comprising one or more electric motors for driving a thrust propeller, and one or more power-generating units for powering the electric motors. The airship also comprises two nacelles symmetrically arranged on either side of the main body and each configured to receive one or more of the power-generating units, each ducted nacelle comprising a mechanical structure connected to the rigid structure of the main body by joint, a "fail safe" interface, and at least one rod or stay cable between a first point of attachment on the rigid structure of the main body and a second point of attachment on the mechanical structure of the nacelle.

12 Claims, 3 Drawing Sheets

(56) References Cited

U.S. PATENT DOCUMENTS

| | | | |
|---|---|---|---|
| 11,685,500 B2 * | 6/2023 | White | B64B 1/22 244/30 |
| 2018/0022461 A1 | 1/2018 | Nunes et al. | |
| 2018/0319476 A1 | 11/2018 | Araujo | |
| 2021/0310412 A1 * | 10/2021 | Williams | F02C 7/20 |
| 2022/0081097 A1 * | 3/2022 | White | B64B 1/30 |
| 2023/0286636 A1 * | 9/2023 | White | B64B 1/22 |
| 2024/0051672 A1 * | 2/2024 | Bernard | B64D 35/026 |

FOREIGN PATENT DOCUMENTS

| | | | | |
|---|---|---|---|---|
| DE | 102018006692 A1 * | 2/2020 | | |
| JP | 2005-053353 A | 3/2005 | | |
| RU | 201899 U1 * | 1/2021 | | B64B 1/00 |
| RU | 201900 U1 * | 1/2021 | | B64B 1/06 |
| WO | 2020/159402 A1 | 8/2020 | | |
| WO | WO-2023002132 A1 * | 1/2023 | | B64B 1/28 |
| WO | WO-2023002134 A1 * | 1/2023 | | B64B 1/06 |

OTHER PUBLICATIONS

International Written Opinion for Application No. PCT/FR2022/051454 dated Oct. 20, 2022, 7 pages.

\* cited by examiner

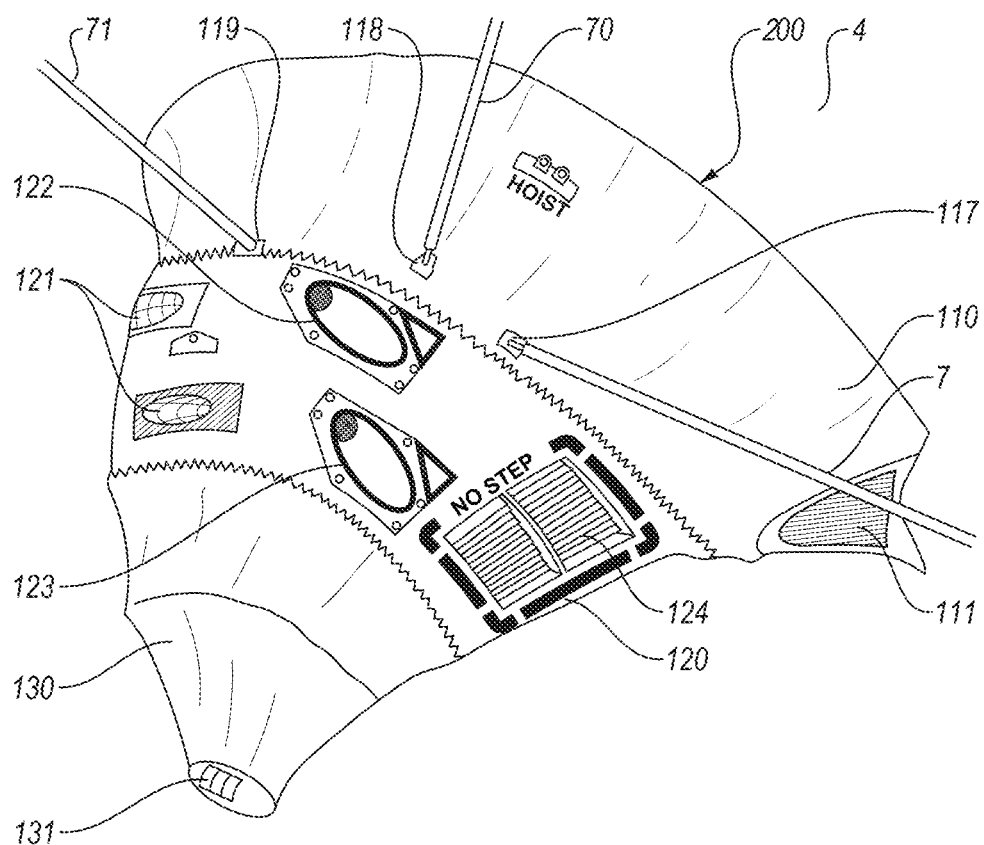
FIG. 3
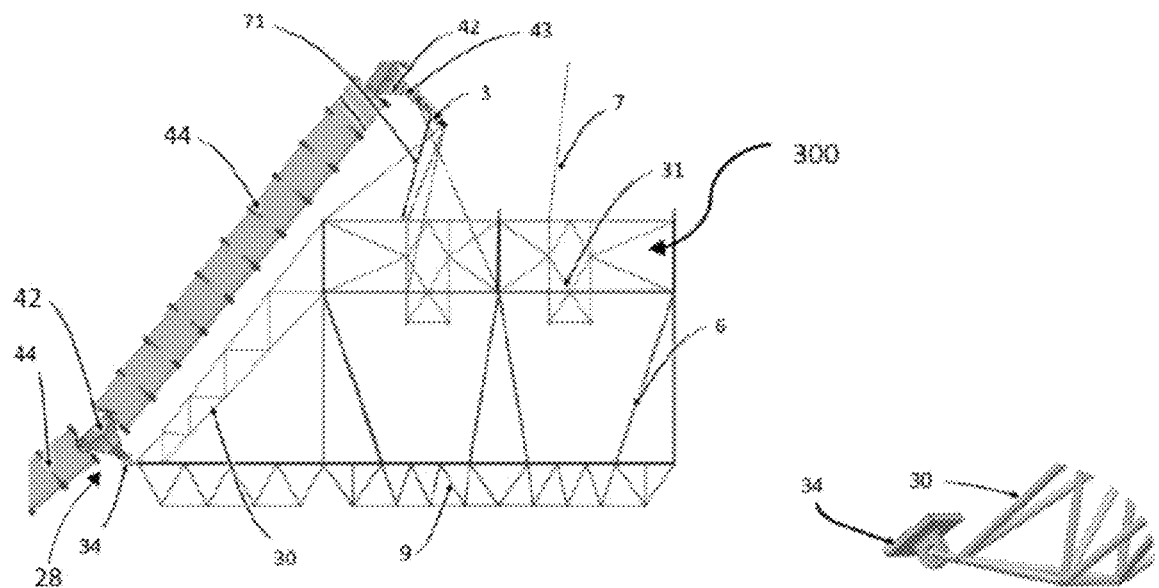
FIG. 4A
FIG. 4B

ELECTRICALLY PROPELLED AIRSHIP HAVING A RIGID FRAME AND POWER-GENERATING NACELLE WITH WHICH THE AIRSHIP IS PROVIDED

CROSS-REFERENCE TO RELATED APPLICATIONS

This application is a national phase entry under 35 U.S.C. § 371 of International Patent Application PCT/FR2022/051454, filed Jul. 21, 2022, designating the United States of America and published as International Patent Publication WO 2023/002133 A1 on Jan. 26, 2023, which claims the benefit under Article 8 of the Patent Cooperation Treaty of French Patent Application Serial No. FR2107881, filed Jul. 21, 2021.

TECHNICAL FIELD

The field of the present disclosure is that of electrically propelled airships having a rigid frame, designed for transporting heavy loads, and more particularly that of the mechanical structure of power-generating nacelles equipping these airships.

BACKGROUND

For supplying power to electrically propelled airships, several technological routes can be envisaged, among which is the use of a turbogenerator or a fuel cell.

For either of these technological routes aiming to provide an on-board power-generating system, the question of the safety of the airship arises in the case of failure of the power-generating system. In particular, in the case of the use of a turbogenerator, a mechanical failure of the turbine shaft may lead to the high-speed ejection of mechanical parts, which can strike the main body of the airship, placing it in a perilous situation. It is also necessary to take into account the fire risk induced by the operation of a turbogenerator in the event of a fuel leak. Likewise, in the use of a fuel cell, there are technological risks due to the presence of hydrogen gas.

For these reasons, these power-generating systems, which may be of high power, are generally located outside the main body of the airship. The risks of propagation of a fire originating at a turbogenerator or the destruction of the mechanical structure of the airship due to ejection of mechanical parts are thus limited. Airship architectures already exist comprising nacelles integrating electrical energy systems mechanically connected to the body of the airship. The production of such nacelles, however, poses technical problems since high levels of electrical power are concerned, both for reasons of optimization of weight and safety of the mechanical connection between these nacelles and the body of the airship.

One objective of the present disclosure is to solve these problems by proposing a new power-generating nacelle structure implemented in an electrically propelled airship.

BRIEF SUMMARY

This objective is achieved with an airship comprising a main body having a rigid frame surrounding a plurality of containers for a lighter-than-air gas, a plurality of propeller units mechanically connected to the rigid frame and each comprising one or more electric motors for driving a thrust propeller, and one or more power-generating units for powering the one or more electric motors.

According to the present disclosure, the airship further comprises two nacelles arranged symmetrically on either side of the main body, and each configured to receive one or more of the power-generating units, each nacelle comprising a mechanical structure connected to the rigid frame of the main body by:

(i) a main mounting interface of a specific point of a lower part of the mechanical structure of the nacelle relative to the rigid frame, (ii) a fail-safe mechanical joint interface between a point of an upper part of the mechanical structure of the nacelle and the rigid frame, provided to maintain a secondary standby mechanical connection beyond a predetermined upper tensile limit, and (iii) at least one rod or stay cable between a first point of attachment on the rigid frame of the main body and a second point of attachment on the mechanical structure of the nacelle.

The rods or stay cables may, for example, comprise a front rod or connecting cable, a rear rod or connecting cable and an upper rod or connecting cable.

The mechanical structure of the nacelle may, for example, be made in the form of a lattice of composite beams/tubes. However, it is also possible to consider using many other materials and techniques to produce this mechanical structure provided they are compatible with safety standards related to fire and the zone classification. It is thus possible to envisage the use of riveted stringers, frames or skins. It is also possible to provide a nacelle structure produced by molding. Furthermore, thermal protection may be provided for parts of the mechanical structure of the nacelle, which have a risk of exposure to fire.

A nacelle may further comprise winch means for controlling the descent of a power-generating unit, the winch means being attached to the upper part of the nacelle structure. It is also possible to provide for the use of ground support equipment (GSE) for the removal of power-generating units.

At least one faired nacelle may further comprise a shroud having a rigid portion that may further comprise openings for at least one ventilation inlet and at least one ventilation outlet of the nacelle.

The nacelle shroud may further comprise a semi-rigid part arranged between the main body of the airship and the rigid part; this semi-rigid part may comprise an outlet for cooling a power storage system and at least one opening for the passage of a rod or stay cable.

The nacelle shroud may further comprise a flexible portion extending from the rigid portion to a distal end of the nacelle that is equipped with a position light device.

In a first configuration, the power-generating unit(s) may comprise at least one turbogenerator. In this configuration, the rigid part of the nacelle may further comprise at least one opening for the outlet of the exhaust gases of this turbogenerator.

In a second configuration, the power-generating unit or units can comprise at least one fuel cell system.

In another embodiment of a nacelle equipping an airship according to the present disclosure, at least one of the faired nacelles may further comprise a shroud of flexible material stretched over a plurality of arches surrounding the nacelle.

According to another aspect of the present disclosure, a nacelle for an airship comprises a main body having a rigid frame surrounding a plurality of containers of a lighter-than-air gas and electric propellers, the nacelle comprising at least one power-generating unit for powering the electric propellers, characterized in that it is faired and comprises a mechanical structure connected to the rigid frame of the main body by:
(i) a main mounting interface of a specific point of a lower part of the mechanical structure of the nacelle relative to the rigid frame,
(ii) a fail-safe mechanical joint interface between a point of an upper part of the mechanical structure of the nacelle and the rigid frame, provided to maintain a secondary standby mechanical connection beyond a predetermined upper tensile limit, and
(iii) at least one rod or stay cable between a first point of attachment on the rigid frame of the main body and a second point of attachment on the mechanical structure of the nacelle.

This nacelle may be fin-shaped or any aerodynamically acceptable shape making it possible to interconnect the internal systems in the airship to the external systems of power-generating units.

BRIEF DESCRIPTION OF THE DRAWINGS

FIG. 3 shows an exemplary embodiment of a shroud of a power-generating nacelle according to the present disclosure.

FIGS. 4A and 4B shows a mechanical structure of a power-generating nacelle according to the present disclosure.

DETAILED DESCRIPTION

Figure 1:
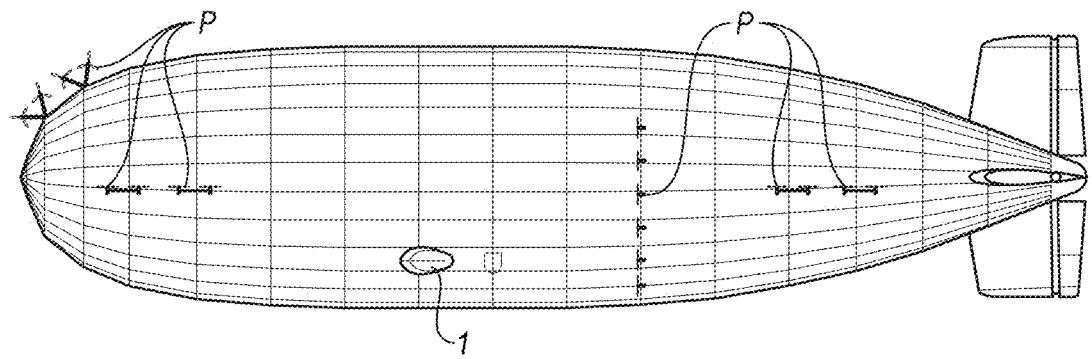
FIG. 1 shows a side view of an exemplary embodiment of an airship equipped with two nacelles for producing electrical energy.

With reference to FIG. 1, an airship having a rigid frame comprises a set of propeller units P supplied with power from power production systems integrated into two fin-shaped external nacelles 1 (only one of which is shown in FIG. 1).

A fin-shaped nacelle 1 comprises a mechanical structure 300 (FIG. 4A) made from a lattice of beams made of composite material and covered with a shell skin or fairing. This mechanical structure 300 comprises a connecting part 30 between an upper part 31 provided to hold two turbogenerators 84.1, 84.2 (FIG. 2) and a lower part 9 (FIG. 4A).

The upper part 31 of the mechanical structure is connected to a rigid structural frame 4 (FIG. 5) of the main body of the airship via a fail-safe mechanical joint interface 3 and three cables 7, 70, 71 (FIG. 3).

The nacelle 1 incorporates two turbogenerator units 84.1, 84.2 mounted suspended from the upper part 31 of the mechanical structure of the nacelle 1, an energy conversion system 85 including storage batteries 92, and a floor 5.

Figure 2:
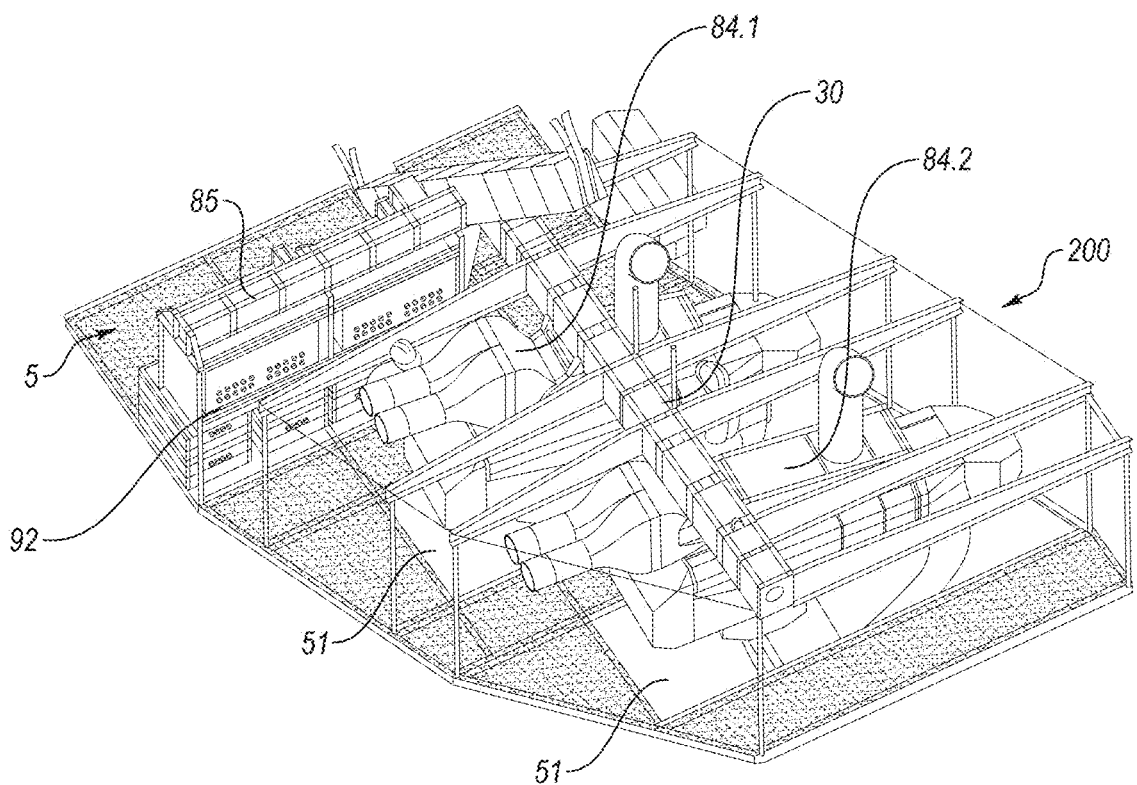
FIG. 2 shows an example of mechanical coupling of a nacelle to the rigid frame of an airship according to the present disclosure.

This floor 5 comprises an access path 50 (FIG. 5) from the interior of the airship D into the nacelle 1, and a floor part 52 (FIG. 5) surrounding the two turbogenerators 84.1, 84.2 (FIG. 2). Recesses 51 are provided in the floor 5 to allow the turbogenerators to be deposited by means of winches provided on the upper part 31 of the mechanical structure. It should be noted that the present disclosure can all be implemented in a nacelle that does not have a floor.

The two turbogenerators 84.1, 84.2 are connected at the output to an energy conversion system 85 at a system of storage batteries 92, which are connected to an electrical distribution system within the airship.

This nacelle is further provided with a thermal management system designed to cool the turbogenerators, and ventilate the containment enclosures containing these turbogenerators, cooling the energy conversion systems and storage batteries. The skin of the nacelle will thus have to receive all the interfaces of the internal systems to the nacelle with the exterior, in particular, air inlet ducts, gas discharge ducts or drains.

In a practical exemplary embodiment of a nacelle shown in FIG. 3, the nacelle shroud 200 comprises a semi-rigid skin part 110 arranged against the rigid structural frame 4 of the airship, a rigid skin part 120 substantially covering the turbogenerators and a flexible skin part 130 covering the distal end of the nacelle in the form of an arch, this distal end being provided with a position light device 131.

The rigid skin part 120, made, for example, from a composite material, comprises openings 121 to receive air inlet ducts 122 intended for ventilating the nacelle, openings 123 for receiving combustion gas discharge ducts of the turbogenerators, and openings 124 for receiving ventilation outlet grids of the nacelle.

The semi-rigid skin part 110, made, for example, of a net polymer type material, comprises an exhaust grill 111 for cooling a system of batteries integrated into the nacelle, and openings 117, 118, 119 intended to allow the stay cables 7, 70, 71 to pass, connecting the mechanical structure of the nacelle to that of the airship.

Figure 5:
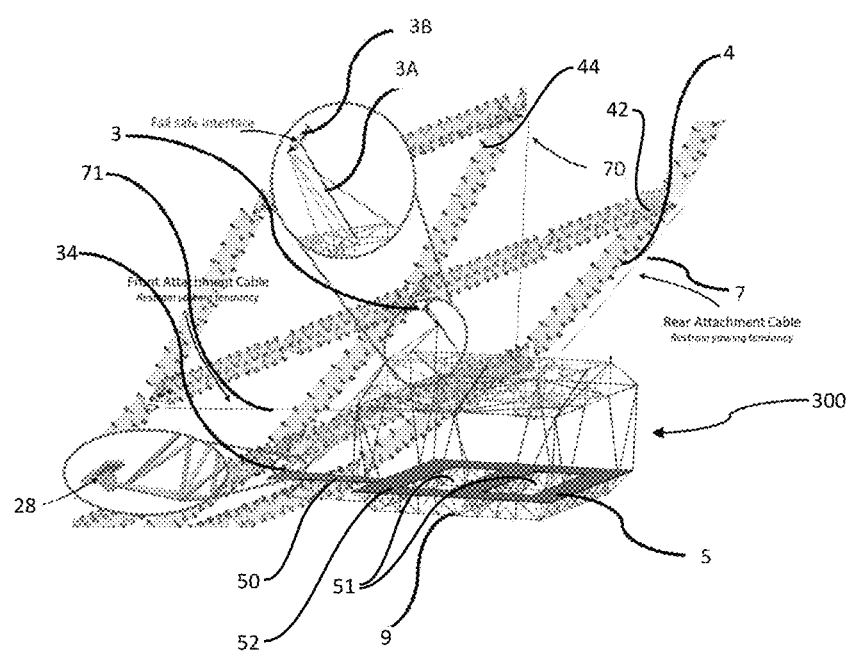
FIG. 5 shows an implementation of the mechanical structure of the nacelle relative to that of the airship.

In an exemplary embodiment of a mechanical structure of a nacelle shown in FIGS. 4A, 4B, and 5, the mechanical structure 300, produced by assembly of a latticework of tubes made of composite material, comprises a connecting part 30 attached at both ends, respectively upper and lower, by respectively a fail-safe mechanical joint interface 3 and a main mounting interface 28 including an articulation 34 to longitudinal structural lattice beams 42 whose ends are connected to peripheral lattice beams 44 in the structure of the main body of the airship.

This connecting part 30 is rigidly connected on the one hand to an upper part 31 designed to suspend two turbogenerators and their ancillary equipment, and on the other hand to a lower part 9 provided to receive a floor 5 allowing an operator access from inside the airship to the turbogenerators for maintenance purposes. Mechanical structural parts 6 are arranged between the upper part 31 and the lower part in order to rigidify the mechanical structure 300 of the nacelle. The mechanical structure 300 is also connected to the rigid structural frame 4 of the main body of the airship by means of three cables or rods 7, 70, 71 serving as a stay, each of the cables or rods having a first lower end fixed at a point of the upper part of the mechanical structure 300 and a second upper end fixed at a point of the rigid structural frame 4 of the main body of the airship.

It is possible, for example, to provide a first front connection cable 7 between a point of the upper part of the nacelle mechanical structure 300 and a point of the rigid structural frame 4 of the airship located forward of the nacelle, a second high-connection cable 70 between a point of the upper part of the nacelle mechanical structure 300 and a point located on a top part of the rigid structural frame 4 of the airship overhanging the nacelle, and a third cable 71 for rear connection between a point of the upper part of the mechanical structure 300 of the nacelle and a point of the rigid structural frame 4 of the airship located behind the nacelle.

In the event of a violent downward thrust experienced by the nacelle leading to the breakage of the main retention cable, or debris severing this main cable, the fail-safe mechanical joint interface 3 performs its function and mechanically switches into "safe" mode by producing a secondary standby mechanical connection, which avoids damage to the structure of the airship. The nacelle is then retained by the stay cables 7, 70, 71, which avoids the loss of this nacelle.

The fail-safe mechanical joint interface 3 may, for example, be made by a rod with a clevis mounting, a mechanical piston 3B and a low-load cable 3A.

Of course, other embodiments of a mechanical structure of a nacelle according to the present disclosure can be envisaged without departing from the scope of the present disclosure. In particular, geometries of the shroud other than the one just described can be envisaged.

The invention claimed is:

1. An airship, comprising:
a main body having a rigid frame surrounding a plurality of containers of a lighter-than-air gas, a plurality of propeller units mechanically connected to the rigid frame and each comprising one or more electric motors for driving a thrust propeller, and power-generating units for powering the one or more electric motors; and
two nacelles symmetrically arranged on either side of the main body, each of the two nacelles configured to receive one or more of the power-generating units, each of the two nacelles comprising a mechanical structure connected to the rigid frame of the main body of the airship by:
a main mounting interface between a lower part of the mechanical structure of the nacelle and the rigid frame of the main body of the airship,
a fail-safe mechanical joint interface between an upper part of the mechanical structure of the nacelle and the rigid frame of the main body of the airship, the fail-safe mechanical joint interface configured to provide a secondary standby mechanical connection between the nacelle and the main body of the airship beyond a predetermined upper tensile limit, and
at least one rod or stay cable between a first point of attachment on the rigid frame of the main body of the airship and a second point of attachment on the mechanical structure of the nacelle.

2. The airship of claim 1, wherein the at least one rod or stay cable comprises a front connection rod or cable, a rear connection rod or cable and a top connection rod or cable.

3. The airship of claim 1, wherein the power-generating units comprise at least one fuel cell system.

4. The airship of claim 1, wherein at least one of the two nacelles further comprises a shroud of flexible material stretched over a plurality of arches surrounding the nacelle.

5. The airship of claim 1, wherein at least one nacelle of the two nacelles further comprises a shroud having a rigid part.

6. The airship of claim 5, wherein the rigid part of the shroud comprises openings for at least one ventilation inlet and at least one ventilation outlet of the at least one nacelle.

7. The airship of claim 6, wherein the shroud further comprises a semi-rigid part arranged between the main body of the airship and the rigid part of the shroud.

8. The airship of claim 7, wherein the semi-rigid part comprises a discharge outlet for cooling an electrical energy storage system in the at least one nacelle.

9. The airship of claim 7, wherein the semi-rigid part of the shroud further comprises at least one opening for the passage of the at least one rod or stay cable.

10. The airship of claim 5, wherein the shroud further comprises a flexible part extending from the rigid part toward a distal end of the at least one nacelle.

11. The airship of claim 1, wherein at least one of the power-generating units comprises at least one turbogenerator.

12. The airship of claim 11, wherein at least one nacelle of the two nacelles comprises a shroud having a rigid part, the rigid part of the shroud comprising at least one opening defining an outlet for exhaust gases generated by the at least one turbogenerator.

* * * * *